United States Patent
Kawamoto et al.

(10) Patent No.: US 7,658,061 B2
(45) Date of Patent: Feb. 9, 2010

(54) GAS TURBINE ENGINE PROVIDED WITH A FOREIGN MATTER REMOVAL PASSAGE

(75) Inventors: Osamu Kawamoto, Wako (JP); Hiroki Nagata, Wako (JP); Masayuki Fukutani, Wako (JP); Mineyasu Oana, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 585 days.

(21) Appl. No.: 10/588,600

(22) PCT Filed: Aug. 31, 2005

(86) PCT No.: PCT/JP2005/015851

§ 371 (c)(1),
(2), (4) Date: Aug. 7, 2006

(87) PCT Pub. No.: WO2006/061929

PCT Pub. Date: Jun. 15, 2006

(65) Prior Publication Data

US 2007/0144139 A1   Jun. 28, 2007

(30) Foreign Application Priority Data

Dec. 6, 2004   (JP) .............................. 2004-353187

(51) Int. Cl.
*F02C 7/05* (2006.01)
(52) U.S. Cl. ...................................... 60/39.092; 55/306
(58) Field of Classification Search ............. 60/39.092, 60/226.1; 55/306; 244/53 B; 415/121.2
See application file for complete search history.

(56) References Cited

U.S. PATENT DOCUMENTS

| 4,463,552 | A | * | 8/1984 | Monhardt et al. | ........... 60/226.1 |
| 5,279,109 | A | * | 1/1994 | Liu et al. | ...................... 60/785 |
| 5,351,473 | A | * | 10/1994 | Shuba | ......................... 60/782 |

FOREIGN PATENT DOCUMENTS

| JP | 63-263225 | 10/1988 |
| JP | 4-224233 | 8/1992 |
| JP | 5-195819 | 8/1993 |
| JP | 2002-517657 | 6/2002 |
| JP | 2002-242699 | 8/2002 |

\* cited by examiner

*Primary Examiner*—Louis J Casaregola
(74) *Attorney, Agent, or Firm*—Squire, Sanders & Dempsey L.L.P.

(57) ABSTRACT

To provide a gas turbine engine which is simple in structure but can effectively remove foreign matters from the combustion air.

The intake passage 21 includes an inlet portion 29, a curved portion 30 and a reduced diameter portion 31. The bypass duct 24 is curved away from the central axial line CL in a region corresponding to the curved portion 30 and reduced diameter portion 31 of the intake passage 29. Between the intake passage 29 and bypass duct 24 is defined an annular space 32. In the reduced diameter portion 31, the outer liner 20 is formed with a large number of foreign matter introduction openings 33 in a circumferential arrangement for communication between the intake passage 21 and annular space 32. The inner casing 4 is formed with a plurality of foreign matter ejection holes 34 in a circumferential arrangement in a part thereof that curves outward for communication between the annular space 32 and bypass duct 24.

14 Claims, 6 Drawing Sheets

GAS TURBINE ENGINE PROVIDED WITH A FOREIGN MATTER REMOVAL PASSAGE

TECHNICAL FIELD

The present invention relates to a gas turbine engine primarily for use in aircraft, and in particular to a technology for preventing the intrusion of dust and water into the combustion chamber.

BACKGROUND OF THE INVENTION

There are various types of gas turbine engine for use in aircraft, but turbofan engines are by far most commonly used in passenger planes and cargo planes. In a turbofan engine, the combustion gas of the gas turbine is expelled rearward and a propeller fan (front fan) provided immediately downstream of the air inlet is driven by the drive shaft of the gas turbine engine. In such a gas turbine engine, a large part of the air drawn into the engine by the front fan is expelled from the rear end of the engine as a propelling airflow while a remaining part of the air is introduced into the combustion chamber of the gas turbine engine as combustion air. In the turbofan engine, combustion gas of high temperature and high pressure is produced by the compressor and the combustion chamber provided in the front end of the engine, and is forwarded to the turbine provided in the rear end of the engine to drive the rotary shaft that integrally carries the impeller of the compressor and front fan. The gas turbine is typically equipped with a compressor of a centrifugal or axial flow type and an annular combustion chamber having a large number of air inlet holes.

In an aircraft gas turbine engine, because the air near the ground is drawn into the air inlet as the aircraft takes off or makes a landing, it is inevitable that the combustion air is mixed with foreign matters. Such foreign matters included in the combustion air may block the air inlet hole of the combustion chamber and/or cause wear to the impeller of the turbine. Therefore, it is desirable to install a countermeasure for removing such foreign matters. A typical arrangement for removing foreign matters in a gas turbine engine consists of a curved passage provided immediately downstream of the diffuser of the centrifugal compressor and a trap port provided in a radially outward part of this passage for removing the foreign matters out of the passage as disclosed in Japanese patent laid open publication No. 2002-242699 (Paragraphs 0017 and 0018, and FIG. 1). In this arrangement for removing foreign matters, the foreign matters trapped by the trap port are stored in a trap chamber, and the engine operator can remove the foreign matters from the trap chamber by removing a plug of the trap chamber when the engine is either not in operation or in operation. It is also possible to provide a solenoid valve instead of the plug to automatically remove the foreign matter while the engine is in operation.

SUMMARY OF THE INVENTION

Tasks to be Achieved by the Invention

When the arrangement for removing foreign matters disclosed in the mentioned Japanese patent laid open publication is applied to an aircraft turbofan engine, the following problems associated with the removal of foreign matters arise. Because a bypass passage having an annular cross section for conducting an airflow for propulsion is formed around the gas turbine, to gain access to the plug of the trap chamber, it is necessary to dismantle the surrounding casing. Therefore, large amounts of time and cost were required when removing foreign matters. The use of a solenoid valve that can automatically open and close eliminates the need to dismantle the casing, but the necessary control system for controlling the opening and closing of the solenoid valve adds to the complexity of the system and the cost. Also, such a control system could fail.

In view of such problems of the prior art, a primary object of the present invention is to provide a gas turbine engine which can effectively remove foreign matters from the combustion air using a highly simple structure.

A second object of the present invention is to provide a gas turbine engine which can remove foreign matters from combustion air without substantially reducing the efficiency of the engine.

A third object of the present invention is to provide a gas turbine engine which can remove foreign matters from combustion air in a highly efficient manner.

Means to Achieve the Task

According to the present invention, at least some of these objects can be accomplished by providing a gas turbine engine provided with a foreign matter removal passage, comprising: an outer casing; an inner casing received in the outer casing so as to define a bypass duct having an annular cross section in cooperation with the outer casing; an outer liner received in the inner casing; an inner liner received in the outer liner so as to define an intake passage in cooperation with the outer liner; a first compressor provided in a downstream end of the intake passage; a combustor connected to an outlet end of the first compressor; a turbine provided adjacent to an outlet end of the combustor; a rotary shaft rotatably received in the inner liner and having a front fan attached to a front end thereof adjacent to both an inlet end of the bypass duct and an inlet portion of the intake passage, the rotary shaft further carrying a impeller wheel of the first compressor and a turbine wheel of the turbine at appropriate parts thereof; and a foreign matter removal passage communicating with the intake passage via a plurality of foreign matter introduction openings formed in the inner casing and with the bypass duct via a plurality of foreign matter ejection openings formed in the outer liner.

Thus, the foreign matters such as dust and water that may be included in the combustion air flowing into the intake passage are ejected to the bypass duct via the foreign matter removal passage, and is expelled rearward out of the engine along with the propulsion air. The combustion air is made free from foreign matters and compressed so that the combustion efficiency can be improved.

Preferably, the intake passage further comprises a curved portion connected to a downstream end of the inlet portion and directed more toward an axial line of the rotary shaft than the inlet portion and a reduced diameter portion connected to a downstream end of the curved portion and defining a part of the intake passage having a smallest diameter with respect to the central axial line, and the foreign matter introduction openings that communicate the intake passage with the foreign matter removal passage are formed at least in a part of the outer liner corresponding to the reduced diameter portion or the curved portion.

Thus, as the combustion air mixed with foreign matters flows in the intake passage, owing to the inertia which is greater for the foreign matters having a greater density than air, the foreign matters tend to travel more straight than the air so that most of the foreign matters that have been introduced into the intake passage are selectively passed into the foreign matter removal passage, and then to the bypass passage. Also, because the configuration of the intake passage forces the combustion air toward the rotary shaft, the combustion air can be efficiently compressed and the combustion efficiency can be thereby improved.

According to a preferred embodiment of the present invention, the foreign matter removal passage is defined between the inner casing and outer liner at least in a region adjacent to the curved portion or reduced diameter portion of the intake passage. Thereby, the passage arrangement for conducting the foreign matters can be simplified, and the position and number of the openings formed in the intake passage and bypass duct for communication with the foreign matter removal passage can be selected freely.

Typically, the first compressor comprises a centrifugal compressor, and an upstream end of the intake passage is provided with a second compressor comprising an axial flow compressor. If the foreign matter introduction openings are formed in a part of the outer liner corresponding to a part of the intake passage extending into a front end of the first compressor, the pressure produced by the first compressor helps the foreign matters to be forced into the foreign matter removal passage. Also, if the first compressor consists of a centrifugal compressor which has a front end having a relatively small diameter and a rear end having a relatively large diameter, by making a part of the bypass duct corresponding to the curved portion of the intake passage curve radially outward, a relatively large annular space can be defined between the intake passage and bypass passage adjacent to the front end of the first compressor, and it can be conveniently used as the foreign matter removal passage.

If the foreign matter introduction openings are formed in the outer liner in a circumferential arrangement, foreign matters can be evenly removed from the combustion air. If the foreign matter introduction openings are each provided with an elongated configuration selected from a group consisting of a slot, an elliptic hole and a rectangular hole, and each foreign matter introduction opening provided with an elongated configuration has a lengthwise axis slanted with respect to the central axial line, relatively large foreign matters can be removed without unduly reducing the rigidity of the outer liner.

If the foreign matter ejection holes are formed in the inner casing in a circumferential arrangement, foreign matters can be evenly removed from the combustion air that has flowed into the foreign matter removal passage.

According to a preferred embodiment of the present invention, the foreign matter ejection holes are formed in a part of the inner casing recessed from a general wall surface of the inner casing facing the bypass duct. Because the propulsion airflow in the bypass duct produces a region of reduced pressure in such a recessed part, the air mixed with foreign matter can be effectively drawn from the foreign matter removal passage to the bypass duct. This effect is particularly enhanced if the recess part is covered by a lid plate which defines an opening in a rear edge thereof.

BRIEF DESCRIPTION OF THE DRAWINGS

Now the present invention is described in the following with reference to the appended drawings, in which.

DETAILED DESCRIPTION OF THE PREFERRED EMBODIMENTS

Now the present invention is described in the following in more detail in terms of a concrete embodiment with reference to the appended drawings.

Figure 1:
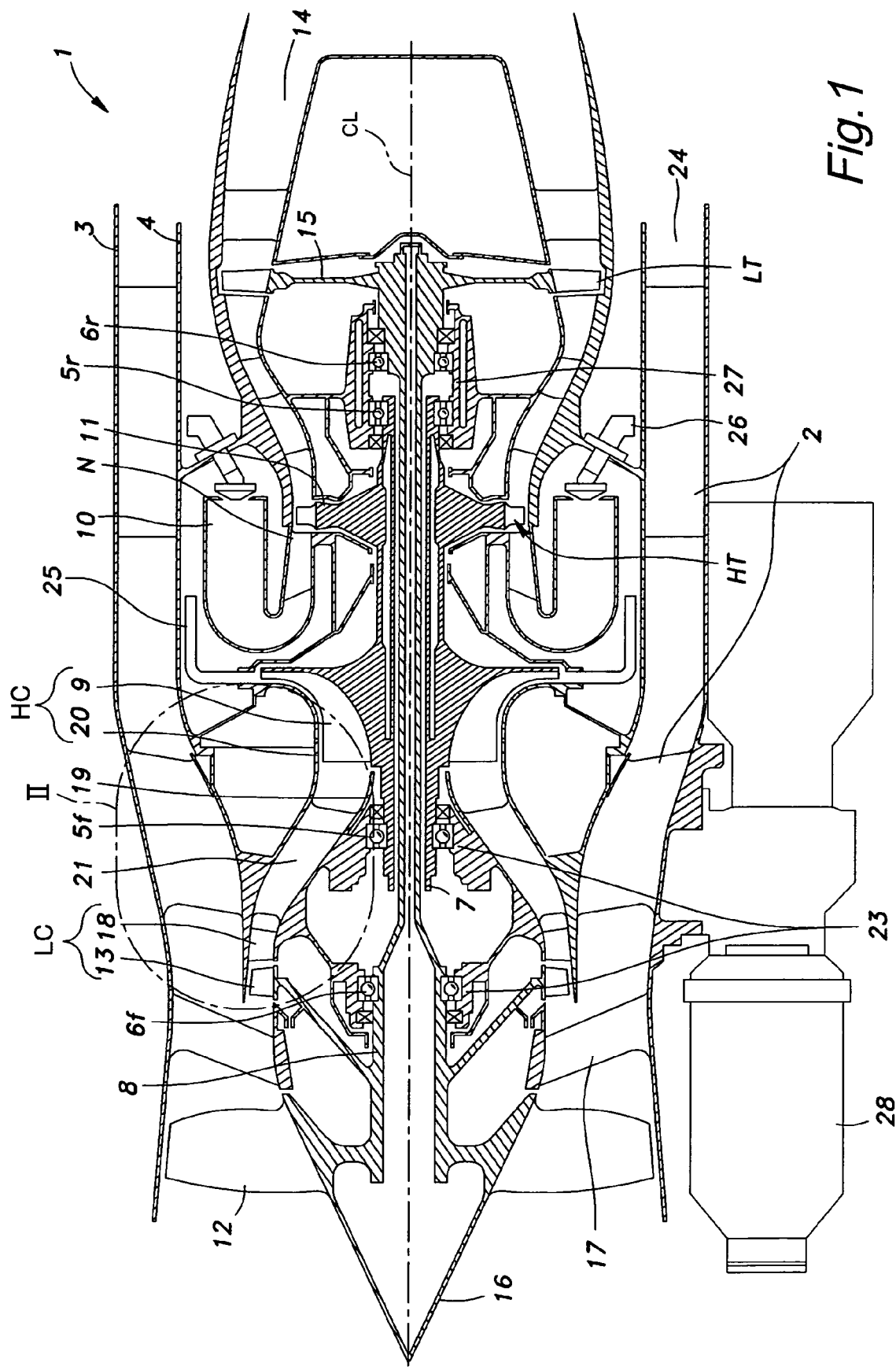
FIG. 1 is a simplified vertical sectional view of a jet engine embodying the present invention.

FIG. 1 is a simplified overall view of a turbofan engine (which is referred to simply as "engine" hereinafter). This engine 1 comprises an outer casing 3 and an inner casing 4 which are both cylindrical in shape and disposed in a mutually coaxial relationship joined by straightening vanes 2. The engine 1 further comprises a rotary shaft including an outer shaft 7 and an inner shaft 8 which are centrally supported in the inner casing 4 by mutually independent bearings $5f$, $5r$, $6f$ and $6r$. "CL" in the drawing denotes the central axial line (rotative axial line) of the outer shaft 7 and inner shaft 8.

The outer shaft 7 is integrally provided with an impeller wheel 9 for a high pressure centrifugal compressor (second compressor means) HC at a front end thereof and a high pressure turbine wheel 11 for a high pressure turbine HT, which is disposed adjacent to the nozzle N of a combustor 10, at a rear end thereof.

The inner shaft 8 is integrally provided with a front fan 12 at a front end thereof, a compressor wheel 13 incorporated with rotor vanes of a low pressure axial flow compressor (first compressor means) LC to the rear of the front fan 12 and a low pressure turbine wheel 15, which is disposed in a jet duct 14 and incorporated with rotor vanes for a low pressure turbine LT, at a rear end thereof.

The front fan 12 is centrally provided with a nose cone 16. To the rear of the front fan 12 are provided a plurality of stator vanes 17 each having a radially outer end secured to an inner circumferential surface of the outer casing 3.

Stator vanes 18 for the low pressure axial flow compressor LC are attached to the inner casing 4 adjacent to a front end thereof. To the rear of the low pressure axial flow compressor LC is disposed an intake passage 21 defined by an inner liner 19 and an outer liner 20 and having an annular cross section for conducting the combustion air pre-compressed by the low pressure axial flow compressor LC. The high pressure centrifugal compressor HC is provided in a downstream end of the intake passage 21, and a rear part of the outer liner 20 serves as the impeller casing for the high pressure centrifugal compressor HC. To the inner periphery of the intake passage 21 is attached a bearing box 23 that accommodates the bearings $5f$ and $6f$ supporting the front ends of the outer shaft 7 and inner shaft 8, respectively.

The air drawn by the front fan 12 is in part forwarded to the low pressure axial flow compressor LC and then to the high pressure centrifugal compressor HC. The remaining part of the drawn air or a large part of the drawn air having a relatively low speed is passed rearward through a bypass duct 24 defined between the outer casing 3 and inner casing 4, and provides a primary thrust force in a low speed range.

A diffuser 25 is attached to the outer periphery of the high pressure centrifugal compressor HC to supply a high pressure air to the combustor 10 disposed immediately downstream thereof.

The combustor 10 is of an annular type having a large number of air inlet holes (not shown in the drawings). The fuel injected from a fuel injection nozzle 26 provided in a rear end surface thereof is mixed with the high pressure air forwarded from the diffuser 25, and combusted in the combustor 10. A thrust is produced by the combustion gas expelled, via the nozzle N that faces rearward, from the jet duct 14 to the atmosphere. To the inner periphery of the jet duct 14 is attached a bearing box 27 accommodating the bearings 5r and 6r supporting the rear ends of the outer shaft 7 and inner shaft 8, respectively. To the outer shaft 7 of the engine 7 is connected an output shaft of a starter motor 28 via a gear box not shown in the drawings.

Foreign Matter Removal Passage

The foreign matter removal passage of the illustrated embodiment is now described in the following primarily with reference to FIG. 2 (an enlarged view of a part of FIG. 1 indicated by II).

Figure 2:
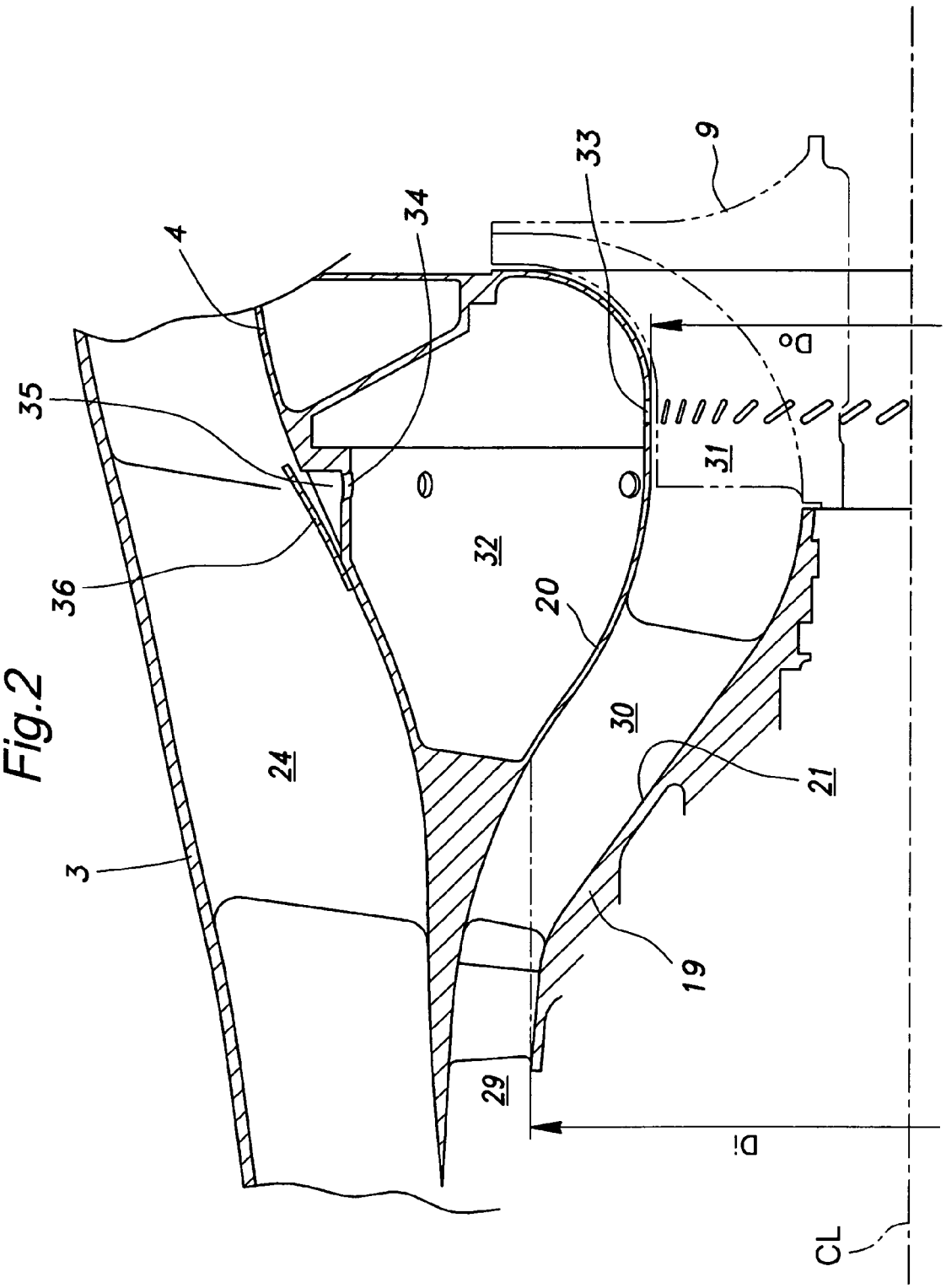
FIG. 2 is an enlarged view of a part of FIG. 1 indicated by II.

Referring to FIG. 2, the intake passage 21 includes an inlet portion 29 provided with the stator vanes 18 of the low pressure axial flow compressor LC, a curved portion 30 that curves inward (or toward the central axial line CL) and a reduced diameter portion 31 accommodating a front part of the impeller wheel 9 of the high pressure centrifugal compressor HC. The inlet portion 29 has a larger diameter than the remaining part of the intake passage 21 and the reduced diameter portion 31 has a smaller diameter than any other part of the intake passage. The curved portion 30 has a diameter which progressively and smoothly decreases from the side of the inlet portion 29 to the reduced diameter portion 31. The reduced diameter portion extends substantially in parallel with the central axial line, and connects to the inlet passage of the high pressure centrifugal compressor HC. Meanwhile, the bypass duct 24 curves outward (or away from the central axial line CL) in a region that corresponds to the curved portion 30 and reduced diameter portion 31 of the intake passage 21. Between the intake passage 21 and bypass duct 24 in this region is defined an annular space 32 serving as the foreign matter removal passage. In the illustrated embodiment, the inner diameter Do of the outer liner 20 in the reduced diameter portion 31 is smaller than the outer diameter Di of the inner liner 19 in the inlet portion 29.

Figure 3:
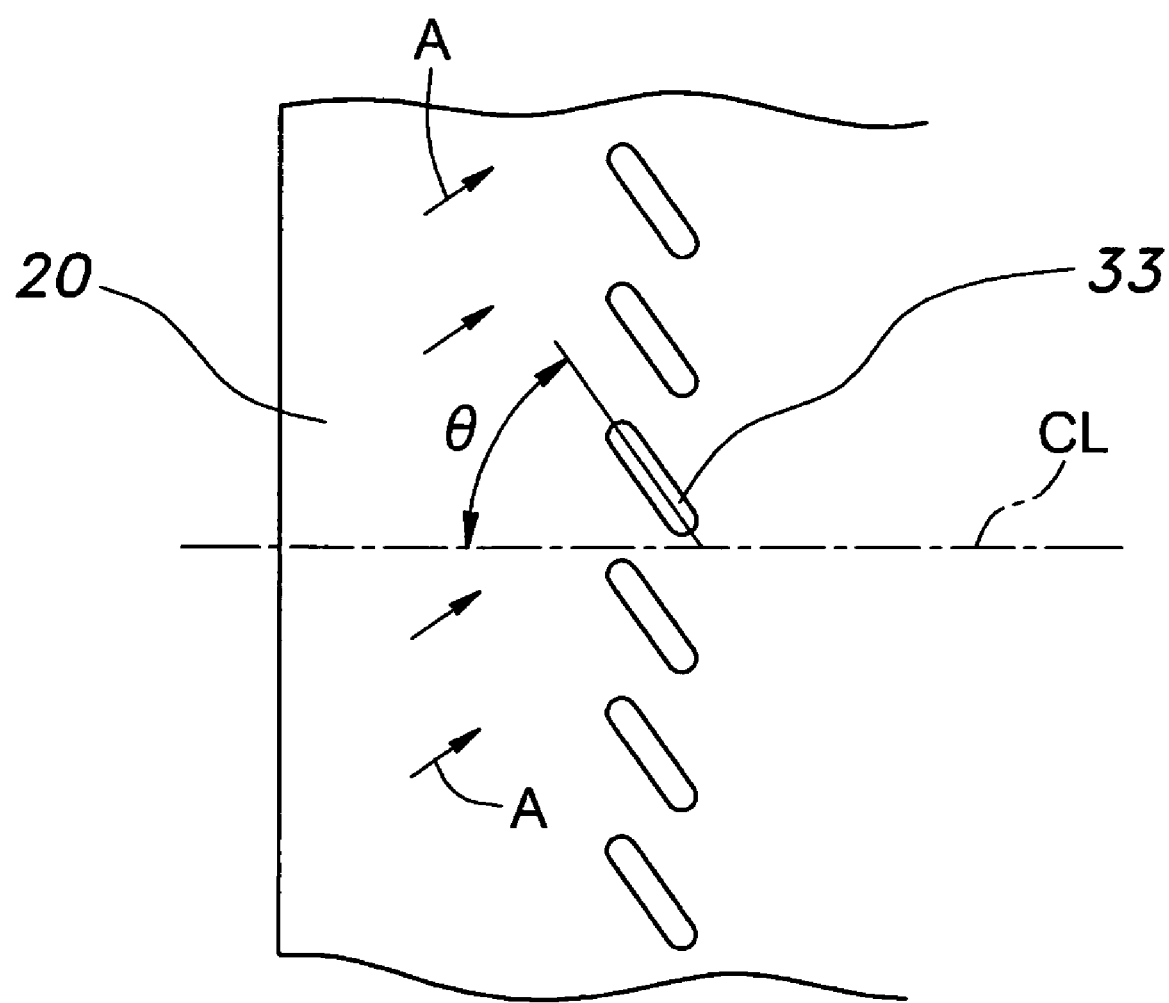
FIG. 3 is a developed view of an essential part of the outer liner of the embodiment of the present invention.

The part of the outer liner 20 corresponding to the reduced diameter portion 31 of the intake passage 21 is formed with a large number (40, for instance) of foreign matter introduction holes 33 arranged in a circular pattern for communicating the intake passage 21 with the annular space 32. As shown in FIG. 3 (developed view of an essential part of the outer liner 20), these foreign matter introduction holes 33 are formed in the outer liner 20 as elongated slots each having an lengthwise axis which is slanted by an angle θ (50 to 60 degrees) with respect to the central axial line CL. Also, because the airflow in the intake passage 21 has a certain amount of circumferential component as indicated by arrows A in FIG. 3, it is advantageous to slant the foreign matter introduction holes 33 to extend substantially perpendicular to the airflow.

The part of the inner casing 4 curving outward is likewise provided with a number (6, for instance) of foreign matter ejection holes 34 arranged in a circular pattern for communicating the bypass duct 24 with the annular space 32. Each of the foreign matter ejection holes 34 is formed in a part of the inner casing 4 facing the bypass duct 24 and formed with an individual recess 35, and each recess 35 is provided with a cover plate 36 which generally covers the recess 35 but defines an opening directed downstream (rightward in FIG. 2) in the bypass duct 24. The individual recesses 35 may be replaced by an annular recess common to all of the foreign matter ejection holes 34.

Mode of Operation of the Embodiment

As the pilot activates the starter motor 28 in preparation for a flight, the impeller wheel 9 of the high pressure centrifugal compressor HC is actuated via the outer shaft 7, and high pressure combustion air is forwarded to the combustor 10. The combustion air is mixed with the fuel injected from the fuel injection nozzle 26, and causes the combustion of the fuel, and the pressure of the combustion gas drives the high pressure turbine wheel 11 of the high pressure turbine HT and the low pressure turbine wheel 15 of the low pressure turbine LT. The rotative power of the high pressure turbine wheel 11 drives the impeller wheel 9 of the high pressure centrifugal compressor HC while the rotative power of the low pressure turbine wheel 15 drives the front fan 12 and the compressor wheel 13 of the low pressure axial flow compressor LC. The pressure of the combustion gas drives the high pressure turbine wheel 11 and low pressure turbine wheel 15, and the engine 1 maintains a certain rotational speed which is determined by the self-feedback balance between the supply of fuel and the volume of intake air.

Figure 4:
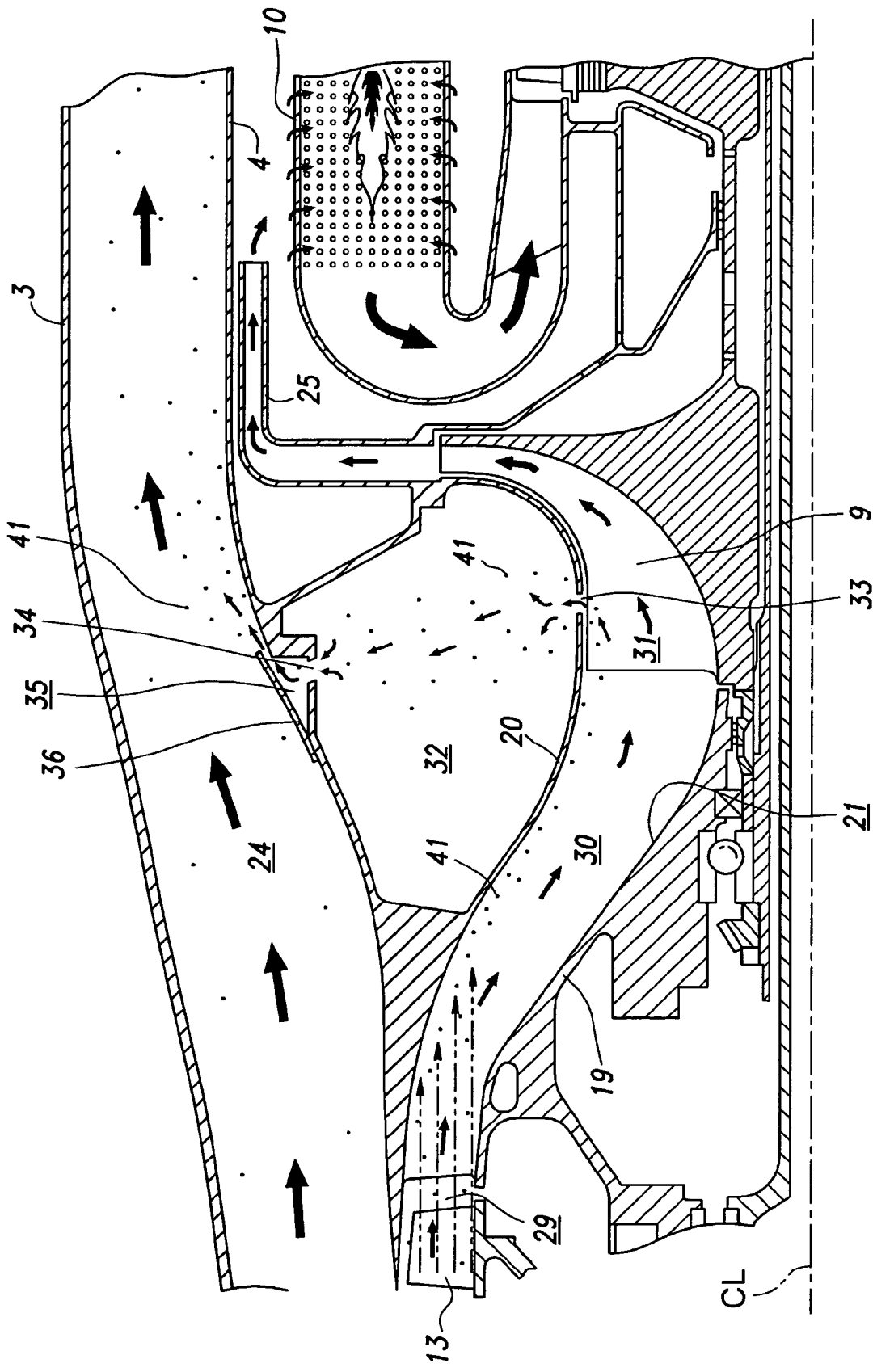
FIG. 4 is a diagram showing a mode of operation of the illustrated embodiment.

When the aircraft either takes off or makes a landing, air containing foreign matters may be drawn from a region near the ground into the engine 1. The air containing foreign matters 41 is in part drawn into the intake passage 21 as combustion air as indicated by the arrows in FIG. 4, and the remaining part of the air is passed through the bypass duct 24 as propulsion air likewise as indicated by the arrows. The combustion air that flows into the inlet portion 29 of the intake passage 21 is pressurized by the low pressure axial flow compressor LC, and flows toward the central axial line along the cured portion 30 of the intake passage 21. Because the foreign matters such as dust and water has a substantially greater density than the combustion air, the foreign matters tend to go straight into the inlet portion 29 of the intake passage 21 until it hits the wall of the outer liner 20 and mostly flows along the inner wall surface of the outer liner 20 as indicated by the narrow arrows in FIG. 4.

The combustion air mostly flows from the intake passage 21 to the high pressure centrifugal compressor HC, but a small part of the combustion air is diverted into the annular space 32 via the foreign matter introduction holes 33 formed in the reduced diameter portion 31. This owes to the fact that the inner pressure of the annular space 32 is lower than that of the intake passage 21 because the annular space 32 communicates with the intake passage 21 at a relatively high pressure via the foreign matter introduction holes 33 on the one hand and with the bypass duct 24 at a relatively low pressure via the foreign matter introduction holes 34 on the other hand. As the combustion air is introduced into the annular space 32 via the foreign matter introduction holes 33, foreign matters 41 that may have been carried by the combustion air along the inner wall surface of the outer liner 20 is subjected to a centrifugal force by the high pressure centrifugal compressor HC, and are introduced into the annular space 32 via the foreign matter introduction holes 33 along with a part of the combustion air. Because each foreign matter introduction hole 33 consists of an elongated slot, relatively large foreign matters can pass through the foreign matter introduction holes 33 and introduced into the annular space 32. Because the lengthwise axial line of each foreign matter introduction hole 33 is slanted with respect to the central axial line CL, almost all of the foreign matters 41 traveling along the inner wall surface of the outer liner 20 can be trapped into the annular space 32.

Because the inner pressure of the annular space 32 is higher than that of the bypass duct 24, the combustion air that has flowed into the annular space 32 is expelled from the foreign matter ejection holes 34 formed in the inner casing 4 along with the foreign matters 41, and expelled rearward from the engine 1 as a part of the propulsion air.

Owing to this arrangement described above, in the illustrated embodiment, the combustion air which is to be compressed in the high pressure centrifugal compressor HC is almost totally free from foreign matters, and the problems of the prior art such as the wear of the impeller wheel and blocking of the combustor 10 can be avoided.

Modified Embodiments

Modified embodiments of the present invention are described in the following.

Figure 5:
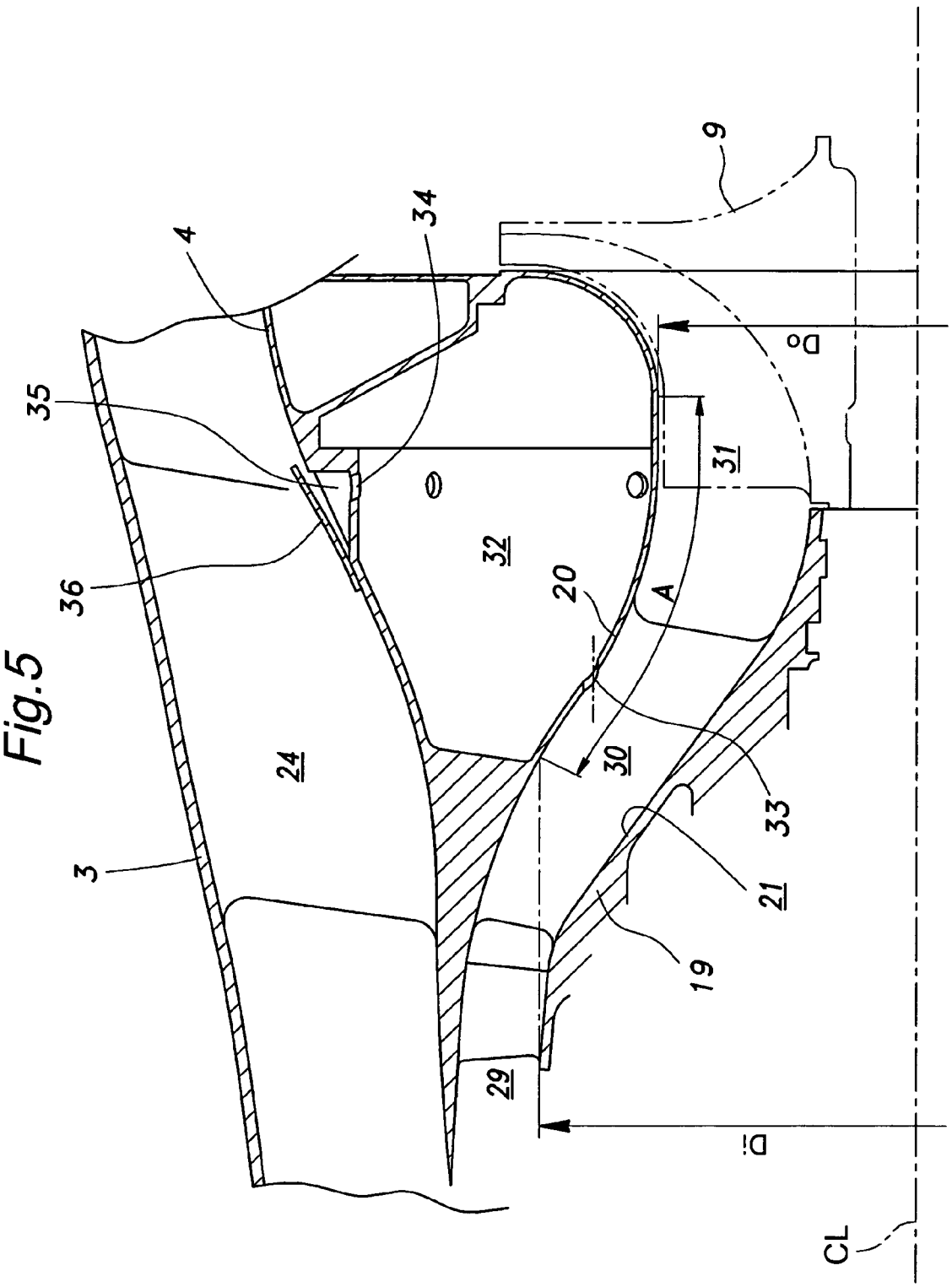
FIG. 5 is a vertical sectional view of a modified embodiment of the present invention.
Figure 6:
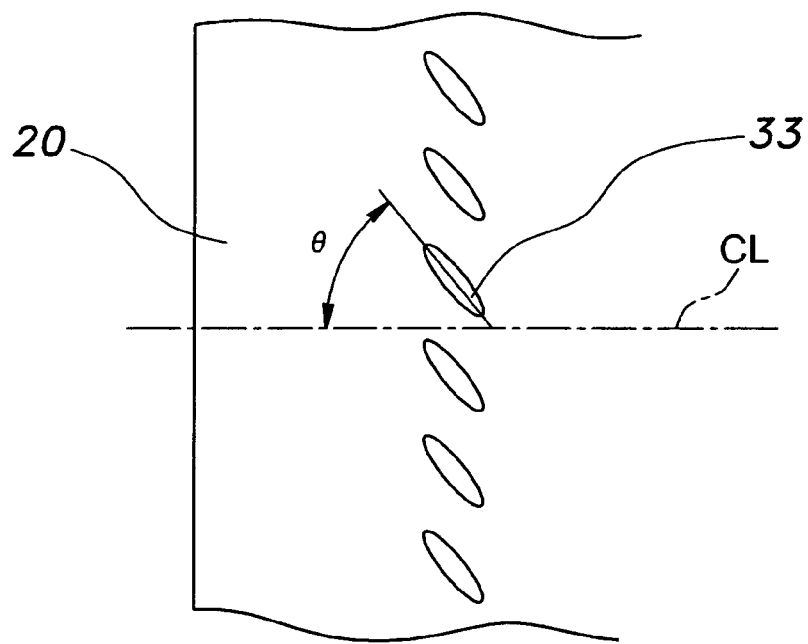
FIG. 6 is a developed view of an essential part of the outer liner of another modified embodiment of the present invention.
Figure 7:
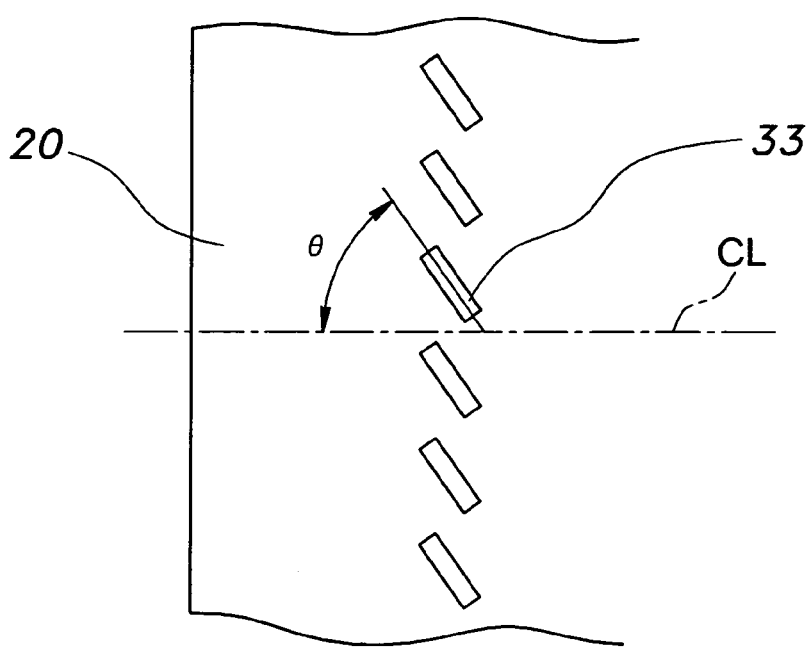
FIG. 7 is a developed view of an essential part of the outer liner of yet another modified embodiment of the present invention.

FIG. 5 is a vertical sectional view of an essential part of a modified embodiment, and FIGS. 6 and 7 are developed views of essential parts of the outer liner 20 of other modified embodiments. In the modified embodiment illustrated in FIG. 5, the foreign matter introduction holes 33 are formed in the part of the outer liner 20 corresponding to the curved portion 30 of the intake passage 21. Each foreign matter introduction hole 33 is defined by an edge of the outer liner 20 which is substantially in parallel with the central axial line CL so that the airflow may flow into the annular space 32 with a minimum resistance. The shape of each hole is circular in the illustrated embodiment, but may also consist of elongated holes such as those illustrated in FIGS. 2 and 3.

Also, as illustrated in FIG. 6, the foreign matter introduction holes 33 may consist of elliptic holes each formed in the outer liner 20 and having a lengthwise axial line which is slanted by an angle θ (50 to 60 degrees) with respect to the central axial line CL. The foreign matter introduction holes 33 may also consist of rectangular holes as illustrated in FIG. 7. These modified embodiments are application to those illustrated in FIGS. 2 and 5 in which the foreign matter introduction holes 33 are formed in different parts of the intake passage 21.

The mode of operation of the modified embodiment illustrated in FIG. 5 is not different from that of the preceding embodiment. The foreign matters 41 that have traveled along the inner wall surface of the outer liner 20 are introduced into the annular space 32 via the foreign matter introduction holes 33 along with the combustion air. In this connection, it is preferable that the foreign matter introduction holes 33 are formed in a region of the outer liner 20 extending between the outer diameter line Di of the inner liner in the inlet portion 29 and the reduced diameter portion 31 as seen on a projection plane perpendicular to the central axial line. For most of the foreign matters 41 that pass through the inlet portion 29 to hit the outer liner 20 inside the outer diameter line Di, it is advantageous to form the foreign matter introduction holes 33 outward of the inner diameter line Do and thereby increase the probability of the foreign matters 41 to be introduced into the foreign matter introduction holes 33. Also, if the foreign matter introduction holes 33 are formed more toward the right than the reduced diameter portion 31 in FIG. 5, the probability of the foreign matters 41 to flow into the high pressure centrifugal compressor HC increases.

The present invention was described in terms of specific embodiments, but the present invention is not limited by the illustrated embodiments, and can be changed in various parts thereof, such as the shapes and numbers of the foreign matter introduction holes, foreign matter ejection holes and annular space, can be changed without departing from the spirit of the present invention.

| Glossary | |
|---|---|
| 1 | engine |
| 10 | combustor |
| 12 | front fan |
| 13 | compressor wheel |
| 19 | inner liner |
| 20 | outer liner |
| 21 | intake passage |
| 24 | bypass duct |
| 29 | inlet portion |
| 30 | curved portion |
| 31 | reduced diameter portion |
| 32 | annular space (foreign matter removal passage) |
| 33 | foreign matter introduction hole (foreign matter removal passage) |
| 34 | foreign matter ejection hole (foreign matter removal passage) |
| 41 | foreign matter |
| CL | central axial line |

The invention claimed is:

1. A gas turbine engine, comprising:
an outer casing;
an inner casing received in the outer casing so as to define a bypass duct having an annular cross section in cooperation with the outer casing;
an outer liner received in the inner casing;
an inner liner received in the outer liner so as to define an intake passage in cooperation with the outer liner;
a first compressor provided in a downstream end of the intake passage;
a combustor connected to an outlet end of the first compressor;
a turbine provided adjacent to an outlet end of the combustor;
a rotary shaft rotatably received in the inner liner and having a front fan attached to a front end thereof adjacent to both an inlet end of the bypass duct and an inlet portion of the intake passage, the rotary shaft further carrying a impeller wheel of the first compressor and a turbine wheel of the turbine at appropriate parts thereof; and
a foreign matter removal passage communicating with the intake passage via a plurality of foreign matter introduction openings formed in the outer liner and with the bypass duct via a plurality of foreign matter ejection openings formed in the inner casing, wherein the foreign matter removal passage comprises an annular space surrounding the rotary shaft.

2. The gas turbine engine according to claim 1, wherein the intake passage further comprises a curved portion connected to a downstream end of the inlet portion and directed more toward an axial line of the rotary shaft than the inlet portion and a reduced diameter portion connected to a downstream end of the curved portion and defining a part of the intake passage having a smallest diameter with respect to the central axial line, and the foreign matter introduction openings that communicate the intake passage with the foreign matter removal passage are formed at least in a part of the outer liner corresponding to the reduced diameter portion.

3. The gas turbine engine according to claim 1, wherein the intake passage further comprises a curved portion connected to a downstream end of the inlet portion and directed more toward an axial line of the rotary shaft than the inlet portion and a reduced diameter portion connected to a downstream end of the curved portion and defining a part of the intake passage having a smallest diameter with respect to the central axial line, and the foreign matter introduction openings that communicate the intake passage with the foreign matter removal passage are formed at least in a part of the outer liner corresponding to the curved portion.

4. The gas turbine engine according to claim 1, wherein the foreign matter removal passage is defined between the inner casing and outer liner at least in a region adjacent to a curved portion of the intake passage.

5. The gas turbine engine according to claim 1, wherein the foreign matter removal passage is defined between the inner casing and outer liner at least in a region adjacent to a reduced diameter portion of the intake passage.

6. The gas turbine engine according to claim 1, wherein the first compressor comprises a centrifugal compressor.

7. The gas turbine engine according to claim 6, wherein an upstream end of the intake passage is provided with a second compressor comprising an axial flow compressor.

8. The gas turbine engine according to claim 1, wherein the foreign matter introduction openings are formed in the outer liner in a circumferential arrangement.

9. The gas turbine engine according to claim 1, wherein the foreign matter introduction openings are each provided with an elongated configuration selected from a group consisting of a slot, an elliptic hole and a rectangular hole.

10. The gas turbine engine according to claim 9, wherein each foreign matter introduction opening provided with an elongated configuration has a lengthwise axis slanted with respect to the central axial line.

11. The gas turbine engine according to claim 1, wherein the foreign matter ejection holes are formed in the inner casing in a circumferential arrangement.

12. The gas turbine engine according to claim 1, wherein the foreign matter ejection holes are formed in a part of the inner casing recessed from a general wall surface of the inner casing facing the bypass duct.

13. The gas turbine engine according to claim 12, wherein the recess part is covered by a lid plate which defines an opening in a rear edge thereof.

14. The gas turbine engine according to claim 1, wherein a part of the bypass duct corresponding to the curved portion of the intake passage curves radially outward.

* * * * *